United States Patent [19]

Tartter

[11] 4,045,424
[45] Aug. 30, 1977

[54] SALT OF A SULFONIC ACID SUBSTITUTED 1:2 METAL COMPLEX DYE WITH A BASIC DYE AND AN AMINE

[75] Inventor: Arnold Tartter, Lambsheim, Germany

[73] Assignee: BASF Aktiengesellschaft, Ludwigshafen (Rhine), Germany

[21] Appl. No.: 646,925

[22] Filed: Jan. 6, 1976

Related U.S. Application Data

[63] Continuation of Ser. No. 90,089, Nov. 16, 1970, abandoned.

[30] Foreign Application Priority Data

Nov. 26, 1969   Germany .................. 1959306

[51] Int. Cl.² .............. C09B 45/06; C09B 45/10; C09B 45/16; C09B 45/20
[52] U.S. Cl. .................. 260/147; 106/23; 106/288 Q; 106/311; 260/145 A; 260/145 B; 260/149
[58] Field of Search .......... 260/145 A, 145 B, 146 R, 260/147, 149, 150, 151

[56] References Cited

U.S. PATENT DOCUMENTS

| | | | |
|---|---|---|---|
| 2,104,357 | 1/1938 | Straub et al. | 260/147 X |
| 2,490,703 | 12/1949 | Paige | 260/147 X |
| 2,814,614 | 11/1957 | Zickendraht | 260/145 A |
| 2,826,573 | 3/1958 | Strobel et al. | 260/147 |
| 2,841,576 | 7/1958 | Zickendraht et al. | 260/145 A |
| 2,937,165 | 5/1960 | Fiess | 260/145 B |
| 3,030,353 | 4/1962 | Kuster | 260/147 |
| 3,051,696 | 8/1962 | Dettwyler | 260/147 |
| 3,406,162 | 10/1968 | Meier | 260/145 A |
| 3,600,373 | 8/1971 | Zickendraht et al. | 260/146 R |

Primary Examiner—Floyd D. Higel
Attorney, Agent, or Firm—Keil, Thompson & Shurtleff

[57] ABSTRACT

A dye salt of the formula

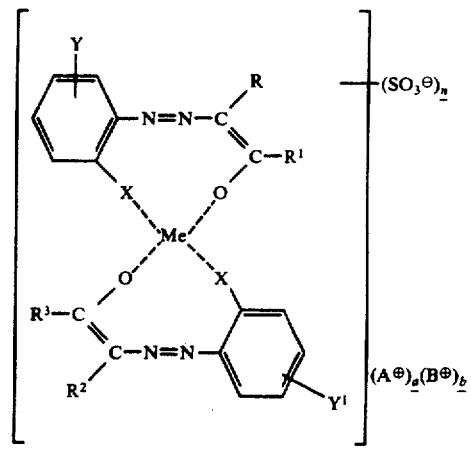

wherein Me is cobalt or chromium, X is —O— or —COO—, Y and Y' each is hydrogen, chlorine or nitro, $n$ is 1 or 2, $a + b = n + 1$ and neither $a$ nor $b$ is zero, the R substituents make up the organic residue of metallizable azo dyes, A is a basic dye and B is an aliphatic amine in quaternized form. These dye salts have good solubility in alcohols, glycols and esters and are useful for the manufacture of transparent varnishes, printing inks and the like.

4 Claims, No Drawings

SALT OF A SULFONIC ACID SUBSTITUTED 1:2 METAL COMPLEX DYE WITH A BASIC DYE AND AN AMINE

This application is a continuation of application Ser. No. 90,089, filed Nov. 16, 1970 (now abandoned).

The invention relates to salts of 1:2 metal complexes of azo or azomethine dyes containing sulfonic acid groups and at least molar amounts of a basic dye and an aliphatic amine.

Complex compounds of metallizable azo dyes and/or azomethine dyes with iron and particularly with cobalt or chromium, are suitable as anionic 1:2 metal complex dyes containing at least one sulfonic acid group and not more than four sulfonic acid groups.

Preferred metallizable azo dyes are o,o'-dihydroxymonoazo dyes; other are o-carboxy-o'-hydroxymonoazo dyes and o-hydroxy-o'-aminomonoazo dyes. Compounds bearing a hydroxy group as substituent in the o-position to the azomethine bond are suitable as azomethine dyes from aromatic amines and aromatic aldehydes. These azo or azomethine dyes preferably contain one sulfonic acid group or two sulfonic acid groups. o,o'-dihydroxyazo dyes are preferred.

The 1:2 metal complexes present as anionic components in the dyes of the invention are known from the literature.

Examples of such dyes are described in German Pat. Nos. 623,347, 929,567, 1,008,253, 1,008,254, 1,012,007, 1,111,318, 1,133,846, 1,226,727 and 1,260,427 and in French Pat. Nos. 1,246,903 and 1,263,830.

Dyes of azo, oxazine, azine, thiazine and methine series are suitable as basic dyes for the dyes according to the invention. Dyes of the triarylmethane series and preferably basic xanthene dyes are of special interest.

The dyes having the following Colour Index numbers are specific examples of basic dyes: 11,270, 11,320, 41,000, 42,000, 42,025, 42,037, 42,040, 42,500, 42,520, 42,535, 42,555, 42,556, 42,600, 44,045, 45,150, 45,160, 45,170, 45,175, 45,215, 46,040, 48,015, 48,020, 48,035, 48,040, 48,055, 48,065, 48,070, 49,005 and 52,015.

The third component contained in the new dyes is a quaternized aliphatic amine which may be a primary, secondary or tertiary, amine having from four to eighteen carbon atoms and which may be of linear, cyclic or particularly branched chain construction. Examples are dibutylamine, hexylamine, decylamine, dodecylamine, octadecylamine, dimethyl palm oil fatty amine, cyclohexylamine, N-methylcyclohexylamine, N-ethylcyclohexylamine, N,N-dimethylcyclohexylamine, diisopropylamine, 2-ethylhexylamine, isononylamine, isotridecylamine or di-2-ethylhexylamine. Amines containing ether groups such as morpholine, dimethylmorpholine, trimethylmorpholine, 1-methoxy-3-aminopropane, 1-ethoxy-3-aminopropane, 1-propoxy-3-aminopropane, 1-isopropoxy-3-aminopropane, 1-tert-butoxy-3-aminopropane, 1-isopentoxy-3-aminopropane, 1-hexoxy-3-aminopropane, 1-($\beta$-ethylhexoxy)-3-aminopropane, isononyloxypropylamine 1-(3',5',5''-trimethylhexoxy)-3-aminopropane, dodecyloxypropylamine or cyclohexyloxypropylamine are of special industrial interest. The amines may be used as such or in the form of their water-soluble salts, for example as formates, acetates or hydrochlorides. Instead of single amines it is often advantageous to use mixtures of amines.

Amines having six to fifteen carbon atoms are preferred.

The new dye salts may be prepared in a simple way by reaction of the metal complex dyes with the basic dyes and amines, for example in an alcoholic or glycolic solvent. The reaction may be carried out advantageously and economically in an aqueous medium and the dye salt which is insoluble or only slightly soluble in water may be isolated by suction filtration, pressing off or centrifuging. Some advantageous methods of production are illustrated in the Examples. These methods may readily be applied to other dyes.

Compound having the formula

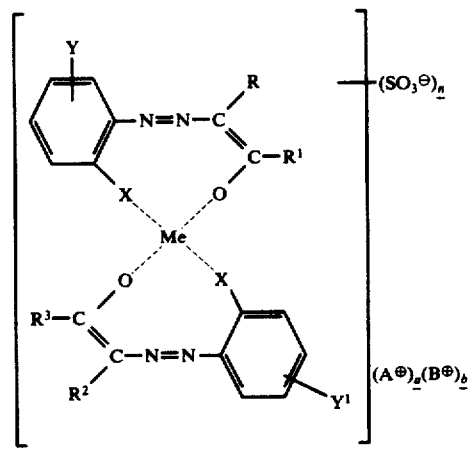

where:-
Me denotes cobalt or chromium;
X denotes —O— or —COO—;
Y denotes hydrogen, chlorine or nitro;
Y¹ denotes hydrogen, chlorine or nitro;
$n$ denotes 1 or 2;
R denotes the radical

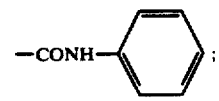

R¹ denotes methyl;
R and R¹ together with the carbon atoms connecting them may denote a radical having the formula:

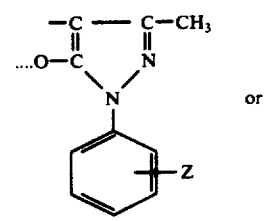 or 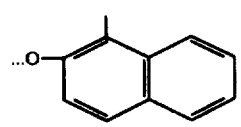

Z denotes hydrogen or chlorine;
A$^{(3\oplus)}$ denotes a dye cation from the series (C.I. numbers in parenthesis):

| | |
|---|---|
| Rhodamine G | (45,150) |
| Rhodamine 6G | (45,160) |
| Rhodamine B | (45,170) |
| Rhodamine F3B | (45,175) |
| Rhodamine 3GO | (45,215) |
| Rhoduline Blue 6G | (42,025) |
| Diamond Green G | (42,040) |
| Diamond Green | (42,000) |

| -continued | |
|---|---|
| Auramine O | (41,000) |
| Methyl Violet | (42,535) |
| Crystal Violet | (42,555) and |
| Ethyl Violet | (42,600); and |

B($^{30}$) denotes a n-hexylammonium, n-decylammonium, n-dodecylammonium, β-ethylhexylammonium, isononylammonium, isotridecylammonium, γ-ethoxypropylammonium, γ-propoxypropylammonium, γ-butoxypropylammonium, γ-isopentoxypropylammonium, γ-hexoxypropylammonium, γ-(β-ethylhexoxy)-propylammonium, or γ-(isononyloxy)-propylammonium cation; and R$^2$, R$^3$ and R$^2$+R$^3$ have the meanings given for R, R$^1$ and R+R$^1$ respectively are of particular industrial importance.

The composition of the dyes according to the invention depends on the number of sulfonic acid groups in the 1:2 metal complex dye because the number of negative charges is equal to the number of sulfonic acid groups + one and the negative charges have to be opposed by an equal number of positive charges in the form of cations. The basic dye and the amine component function as cations and the amine substantially determines the solubility of the new dye salt and the basic dye determines its shade of color. The salts of yellow to red 1:2 metal complex dyes with basic xanthene dyes and etheramines, particularly those of Rhodamines and 2-ethylhexoxypropylamine, are of special industrial interest. The shade of these dyes is fiery red and moreover they have good solubilities.

The new dye salts usually have good to very good solubility in alcoholic and glycolic solvents and also in solvents containing esters. They are suitable for coloring transparent plastics and for the production of transparent varnishes, printing inks, stamping inks or ball point pen inks. They are therefore of particular importance for the surface coatings, metal foil and office supplies industries.

The following Examples illustrate the invention. Parts and percentages in the following Examples are by weight unless stated otherwise.

EXAMPLE 1

A solution of 24 parts of Rhodamine B extra (C.I. 45,170) in 500 parts of water, which has been heated to 50° C, is stirred into a neutral solution of 45 parts of the 1:2 cobalt complex compound of the azo dye 4-nitro-2-aminophenol-6-sulfonic acid → 1-phenyl-3-methyl-5-pyrazolone in 800 parts of water. After a residence time of three hours at from 50° to 55° C, a solution of 20 parts of 2-ethylhexoxypropylamine and 7 parts of glacial acetic acid in 100 parts of water is added gradually while stirring at 20° C. After another 3 hours, the deposited dye is suction filtered and washed in cold water. The dried and ground dye dissolves in alcoholic media with a bright red color.

1 part of the dye prepared in this way is dissolved in a mixture of 6 parts of alcohol-soluble nitrocellulose, 10 parts of butanol, 12 parts of a condensation product of urea and formaldehyde, 49 parts of ethanol, 20 parts of ethyl acetate and 5 parts of ethylene glycol monoethyl ether. The product is an air-drying varnish which can be applied to wood and metal by means of a spraygun.

EXAMPLE 2

85 parts of the azo dye 4-nitro-2-aminophenol-6-sulfonic acid → acetoacetic anilide is stirred with 3000 parts of water with an addition of 10% caustic soda solution at a pH of 7.5. A solution of 25 parts of crystallized cobalt chloride in 100 parts of water is added and the mixture is heated for a short time at from 80° to 85° C so that the 1:2 cobalt complex compound is formed.

A solution of 47 parts of Rhodamine B extra (C.I. No. 45,170) in 1000 parts of water is then dripped into the resultant clear solution, the whole is allowed to cool to about 30° C and, while stirring, a solution of 45 parts of 2-ethylhexoxypropylamine and 13 parts of 90% formic acid in 400 parts of water is added. The whole is allowed to stand for several hours. The precipitate is suction filtered, washed with water and dried at 70° C at subatmospheric pressure. It is then ground. About 170 parts of a red dye is obtained of which about 200 g dissolves per liter of ethanol.

8 parts of the dye prepared in this way is dissolved in a solution of 23 parts of shellac, 70 parts of ethanol and 7 parts of ethylene glycol monoethyl ether by stirring. A flexographic ink is thus obtained which may be used for printing paper, cardboard or sheet metal.

EXAMPLE 3

A solution of 1 mole of the 1:2-chromium complex compound of the azo dye 4-nitro-2-aminophenol-6-sulfonic acid → 1-phenyl-3-methyl-5-pyrazolone in the form of the sodium salt in 12,000 parts of water and a solution of 480 parts of Rhodamine hydrochloride (C.I. 45,170) in 5000 parts of water are stirred together at 45° C and on the following day a solution of 420 parts of 2-ethylhexoxypropylamine and 140 parts of glacial acetic acid in 1600 parts of water is added at room temperature. After a residence time of several hours, the precipitate is filtered off, washed with water and dried. 1660 parts of a dye is obtained which readily dissolves with a fiery red color in alcohols, glycols and ketones and which also has very good solubility in ethyl acetate.

5 parts of the dye obtained in this way is dissolved in a solution of 20 parts of a vinyl chloride copolymer in 60 parts of methyl ethyl ketone and 20 parts of ethyl acetate while stirring at room temperature. A lacquer is obtained which is suitable for printing or lacquering foil, for example aluminum foil.

15 parts of the dye prepared as described above, 25 parts of hexanetriol phthalate and 60 parts of ethyl diglycol are mixed well and dissolved while heating on a waterbath at 90° C. A paste for ball point pens is thus obtained.

Other dyes soluble in ethanol are obtained by replacing the above xanthene dye by a corresponding amount of Rhodamine 3 GO (C.I. 45,215) or Rhodamine F3B (C.I. 45,175) or by using for example 720 or 960 parts of Rhodamine hydrochloride instead of 480 parts, or by using only 320 or 210 parts of amine instead of 420 parts.

EXAMPLE 4

50 parts of the 1:1-chromium complex compound of the azo dye 4-chloro-2-aminophenol-6-sulfonic acid → 1-phenyl-3-methyl-5-pyrazolone and 42 parts of the azo dye 4-nitro-2-aminophenol-6-sulfonic acid → 1-phenyl-3-methyl-5-pyrazolone are stirred in 1500 parts of water, 27 parts of crystallized sodium acetate is added and the whole is heated at 90° C until no further starting compound can be detected by paper chromatography. The solution is filtered while hot and a hot solution of 47 parts of Rhodamine B extra (C.I. 45,170) in 500 parts of water is stirred in followed after ten hours by a solution of 50 parts of 2-ethylhexoxypropylammonium formate in 300 parts of water. Following a conventional working up, a red dye is obtained which dissolves very well in alcoholic solvents and which analogously to Example 1 can be used for the production of an airdrying coating composition.

EXAMPLE 5

28 parts of the azo dye 4-nitro-2-aminophenol-6-sulfonic acid → 1-phenyl-3-methyl-5-pyrazolone and 32 parts of the 1:1-chromium complex compound of the same dye have 11 parts of anhydrous sodium acetate added to them and then the whole heated for six hours in 1000 parts of water under reflux. To the clear solution at 50° C there is then added a solution of 31 parts of Rhodamine 6G (C.I. 45,160) in 400 parts of hot water. The whole is then stirred with a solution of 30 parts of isononyloxypropylamine and 40 parts of glacial acetic acid in 150 parts of water. After the whole has been worked up, a dye is obtained which is soluble in alcoholic solvents with a red color and which is used analogously to Example 1 for the production of an air-drying coating composition.

Similar results can be obtained by replacing the isononyloxypropylamine by 2-ethylhexylamine, dodecylamine, isotridecylamine, isobutoxypropylamine, isopentoxypropylamine, hexoxypropylamine, decyloxypropylamine, dodecyloxypropylamine or tertbutoxypropylamine. In the same way a dye having good solubility is obtained with an amine mixture which has been obtained by adding on a mixture of $C_8$ to $C_{10}$ alcohols followed by reduction. When 26 parts of Rhoduline Blue 6G (C.I. 42,025), 33 parts of Diamond Green G (C.I. 42,040) or 29 parts of Malachite Green (C.I. 42,000) is used for example instead of the Rhodamine compound, green dye salts having good solubility are obtained whereas 22 parts of Auramine (C.I. 41,000) results in an orange yellow dye salt.

EXAMPLE 6

1800 parts of a neutral solution containing 36 parts of the 1:2-chromium complex of the azomethine dye from 4-nitro-2-aminophenol-6-sulfonic acid and salicylaldehyde is stirred at 35° C with a solution of 23 parts of Rhodamine B extra (C.E. 45,170) in 500 parts of hot water. Three hours later a solution of 25 parts of 2-ethylhexoxypropylamine and 9 parts of glacial acetic acid in 200 parts of water is gradually added, the mixture is kept for 1 hour to 2 hours at from 45° to 50° C and suction filtered while hot. After the filtered material has been dried and ground, 74 parts as a dye salt is obtained which is soluble to the extent of more than 200 g per liter in ethanol, ethyl glycol, methyl ethyl ketone and in a mixture of 80 parts of ethyl acetate and 20 parts of ethanol.

6 parts of the dye thus obtained is dissolved in 100 parts of a nitrocelluslose solution consisting of 13 parts of alcohol-soluble pyroxylin, 7 parts of butanol, 68 parts of ethanol, 7 parts of ethylene glycol monoethyl ether and 5 parts of diethyl phthalate. A red solution is obtained which is suitable as an intaglio printing ink for printing paper, cardboard, parchment paper and foil or film, for example of aluminum or acetyl cellulose.

EXAMPLE 7

The adduct of the azo dye 4-nitro-2-aminophenol → 1-phenyl-3-methylpyrazolone-5 (0.5 mole) and the dye anthranilic acid → 1-phenyl-3-methylpyrazolone-5 (0.5 mole) to the 1:1-chromium complex of the azo dye 4-nitro-2-aminophenol-6-sulfonic acid → 1-phenyl3-methylpyrazolone-5 (1 mole) is reacted in aqueous solution with Rhodamine B extra (1 mole) and 2-ethylhexoxypropylammonium formate (1 mole). The dye obtained after the usual working up dissolves in ethyl alcohol with a bright red color.

0.5 part of the dye prepared in this way, 40 parts of an alkyd resin based on coconut oil, 10 parts of a condensation product of formaldehyde and urea, 7 parts of butanol, 27 parts of xylene and 16 parts of ethylene glycol monoethyl ether are worked up into a solution by stirring. This solution, if necessary after having been diluted with the said solvents to a viscosity suitable for spraying, is suitable for a baking finish, particularly for sheet iron. After the solvent has evaporated, the coating, applied for example with a spraygun, is baked for thirty minutes at 120° C.

EXAMPLE 8

A solution of 22 parts of Rhodamine B extra in 450 parts of hot water is stirred at room temperature into a solution of 45 parts of the 1:2-chromium complex of the azo dye 4-nitro-2-aminophenol → acetoacetylanilide-3-sulfonic acid in 750 parts of water. The reaction mixture is then heated for 1 hour to 2 hours at 40° to 50° C and allowed to cool. A solution of 20 parts of 2-ethylhexoxypropylamine and 7 parts of glacial acetic acid in 50 parts of water is added while stirring and the precipitate is suction filtered after a residence period of 5 hours, dried and ground. 84 parts of a red dye is thus obtained which dissolves well in alcohol and which is used for the production of a baking finish in the manner described in Example 7.

EXAMPLE 9

42 parts of the azo dye 4-nitro-2-aminophenol-6-sulfonic acid → 1-phenyl-3-methyl-5-pyrazolone in aqueous solution is added on while hot at a pH of about 6 to 8 onto 55 parts of the 1:1-chromium complex of the azo dye 4-nitro-2-aminophenol-6-sulfonic acid → 1-(4'-sulfo)-phenyl-3-methyl-5-pyrazolone. An aqueous solution of 50 parts of Rhodamine B (C.I. 45,170) or Rhosamine 6G (C.I. 45,160) and then at 5° C an aqueous solution of a mixture of 7 parts of γ-(2-methylpropoxy)-propylamine, 7 parts of γ-(3-methylbutoxy)-propylamine, 37 parts of a γ-(2-ethylhexoxy)-propylamine and 17 parts of formic acid is added to the resultant clear solution at 35° C. A dye is thus obtained which dissolves in alcoholic solvents with a red color and which is used analogously to Example 7 for the production of a baking finish.

Similar results are obtained when the abovedescribed 1:2-chromium complex is replaced by the 1:2-chromium mixed complex obtained by mixed chroming of 50 parts of the azo dye 4-nitro-2-aminophenol-6-sulfonic acid → 1-(4'-sulfo)-phenyl-3-methyl-5-pyrazolone and 42 parts of the azo dye 4-nitro-2-aminophenol-6-sulfonic acid → 1-phenyl-3-methyl-5-pyrazolone or 39 parts of the azo dye 2-aminophenol-4-sulfonic acid → acetoacetylanilide and reacted in a corresponding manner.

EXAMPLE 10

18 parts of the azo dye 4-chloro-2-aminophenol → 1-(3'-chlorophenyl)-3-methyl-5-pyrazolone or 16 parts of the azo dye anthranilic acid → acetoacetylanilide or 15 parts of the azo dye 4-nitro-2-aminophenol → β-naphthol is added on in an aqueous medium to 27 parts of the 1:1-chromium complex of the azo dye 4-chloro-2- aminophenol-6-sulfonic acid → 1-(3'-sulfophenyl)-3-methyl-5-pyrazolone and the solution obtained in each case is filtered while hot. The filtered solutions are then mixed with an aqueous solution of 24 parts of Rhodamine B and an aqueous solution of 20 parts of ethylhexoxypropylamine and 8 parts of glacial acetic acid at room temperature while stirring.

Dyes are thus obtained which are soluble in alcoholic solvents, which have different red tints and which are used for the production of baking finishes analogously to Example 7.

Other red dyes soluble in ethyl alcohol (which may be used as described in Examples 1 to 10 for the production of coating compositions, printing inks or ball point pen inks) are obtained by adding on the dyes specified in column I to the 1:1 chromium complexes of column II and reacting with the basic dyes of column III and the amines of column IV.

R is

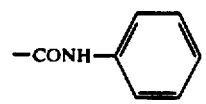

when $R^1$ is methyl, or $R + R^1$ together with the linking carbon atoms therebetween denote the radical

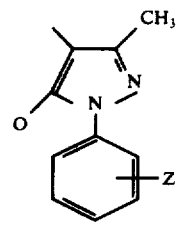

| I | II | III | IV |
|---|---|---|---|
| 5-nitro-2-amino phenol → 1-phenyl-3-methyl-5-pyrazolone | 4-chloro-2-amino phenol-6-sulfonic acid → 1-phenyl-3-methyl-5-pyrazolone | Rhodamine B extra C.I. 45,170 | 2-ethylhexoxy-propylamine |
| " | | Rhodamine 6G C.I. 45,160 | isononyloxy-propylamine |
| anthranilic acid → acetoacetyl-o-anisidide | 4-nitro-2-amino-phenol-6-sulfonic acid → salicylaldehyde | Rhodamine B extra C.I. 45,170 | 2-ethylhexoxy-propylamine |
| anthranilic acid → acetoacetyl-anilide | 4-nitro-2-amino-phenol-6-sulfonic acid → 1-phenyl-3-methyl-5-pyrazolone | " | " |
| anthranilic acid → 1-phenyl-3-methyl-5-pyrazolone | " | " | 1-tertiary-butoxy-propylamine |
| " | " | Rhodamine G C.I. 45,150 | 2-ethylhexoxy propylamine |
| " | 4-nitro-2-amino-phenol-6-sulfonic acid salicylaldehyde | Rhodamine B extra C.I. 45,170 | dodecyloxy-propylamine |

I claim:
1. The salt of a 1:2 metal complex dye having the formula

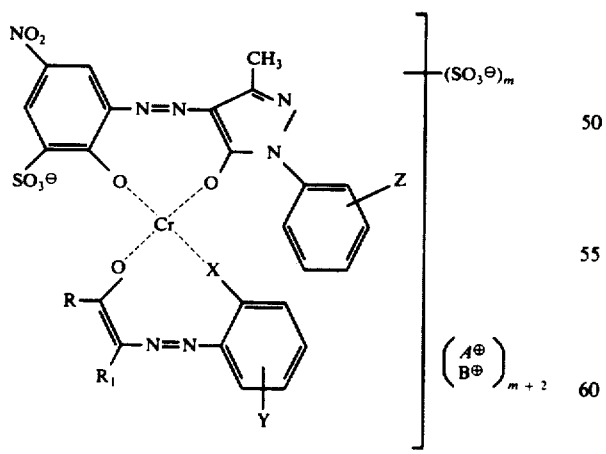

in which:
$m$ is zero or 1;
X is —O— or —COO—;
Y is hydrogen, chloro or nitro;
Z is hydrogen or chlorine;

in which Z is hydrogen or chlorine;
$A^\oplus$ is a cation selected from the class consisting of Rhodamine G, Rhodamine 6G, Rhodamine B, Rhodamine F3B, Rhodamine 3GO, Rhodamine blue 6G, Brilliant green, Malachite green, Auramine, Methyl violet, Crystal violet, and Ethyl violet; and
$B^\oplus$ is a cation selected from the class consisting of n-hexylammonium, n-decylammonium, n-dodecylammonium, β-ethylhexylammonium, i-nonylammonium, i-tridecylammonium, γ-ethoxy-, γ-propoxy-, γ-butoxy- γ-isopentoxy- and γ-hexoxy-propylammonium, γ- (β-ethylhexoxy)-propylammonium and γ-(i-nonyloxy)-propylammonium.

2. The salt of 1:2 metal complex dye having the formula

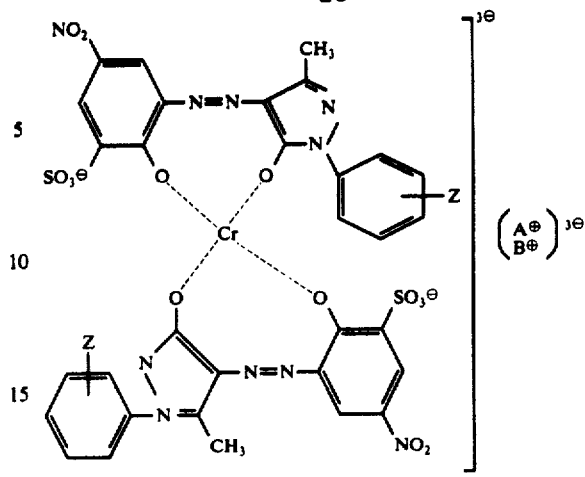
in which $A^\oplus$, $B^\oplus$ and Z have the meaning given in claim 1.
3. The dye salt according to claim 3 in which $A^\oplus$ is a Rhodamine cation and $B^\oplus$ is γ-(β-ethylhexoxy)-propylammonium.
4. The dye having the formula
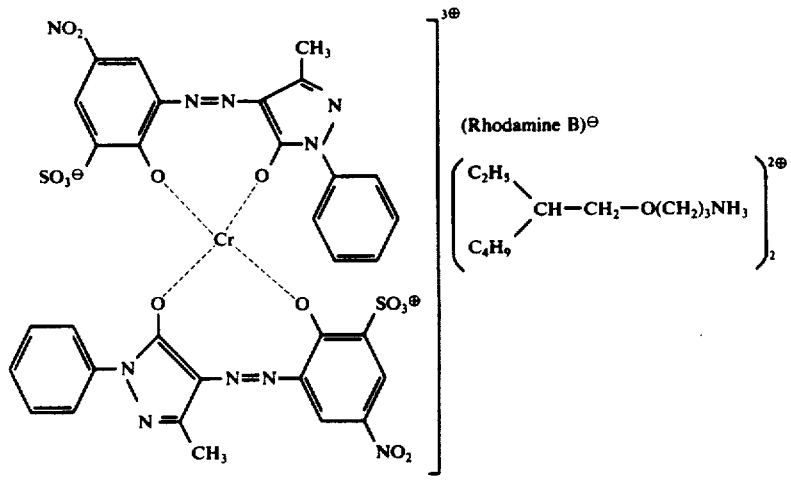
* * * * *